United States Patent Office 3,799,805
Patented Mar. 26, 1974

3,799,805
PROCESS FOR THE PRODUCTION OF DEXTRINS
Kaname Sugimoto, Okayama, Japan, assignor to Hayashibara Company, Okayama, Japan
No Drawing. Filed Aug. 18, 1971, Ser. No. 172,899
Claims priority, application Japan, Sept. 2, 1970, 45/76,856
Int. Cl. C13l 1/08
U.S. Cl. 127—38                    2 Claims

ABSTRACT OF THE DISCLOSURE

Process for the production of dextrins with relatively low molecular weights and a narrow range of molecular distribution, wherein the stage of modifying starch with an acid or with acids is performed by heating the starch with an acid or acids in an aqueous solution of organic solvent or organic solvents selected from the group comprising ethanol, methanol propanol, acetone and fatty acids.

---

The present invention relates to a process for the production of dextrins with relatively low molecular weights and a narrow range of molecular distribution, wherein the stage of modifying starch with an acid or with acids is performed by heating the starch with an acid or acids in an aqueous solution of organic solvent or organic solvents selected from the group comprising propanol, ethanol, methanol, acetone and fatty acids.

The invention will now be described more particularly. The conventional modified starches are produced by immersing starch granules in a diluted solution of an acid or acids wherein the starch is treated for several days at lower than room temperature, and then deacidifying and drying the resultant. Since the swelling and gelatinizing point of starch granules is around 60° C., in the prior art starch is treated at a temperature lower than room temperature to prevent gelatinization. Therefore the prior teachings are disadvantageous because of their requirement of a treatment for several days. This is especially true in the production of low molecular dextrins, since low molecular dextrins are highly water-soluble, low temperature treatment becomes much more necessary, otherwise the recovery rate decreases.

The inventors studied methods for the production of low molecular dextrins attainable in a higher yield and in a shorter period without gelatinizing the starch granules. The methods the inventors studied will be described hereafter. Since it is necessary to elevate the reaction temperature in order to shorten the reaction time, in order to prevent swelling, gelatinization and elution of the starch granules which naturally accompany the elevation of the reaction temperature, the inventors investigated methods to prevent elution of fresh dextrins and oligosaccharides and to prevent the gelatinization of the starch, by the employment of ethanol, methanol or propanol, a successful process was developed, the reaction time of which can be shortened considerably by treating the starch granules at elevated temperatures without causing either gelatinization of the starch granules or elution of the fresh dextrins. Simutaneosuly, dextrins are produced with low degrees of polymerization (hereinafter referred to as D.P.) in a high yield.

According to the conventional prior art, in which dextrins are produced by treating starch granules with a dilute solution of an acid or acids at a reaction temperature exceeding 37° C., the starch granules swell and become soluble with the progress of the treatment and eventually the low molecular dextrins, with D.P.'s lower than about 28, elute. Therefore the conversion of the starch granules intact into dextrins is impossible. If the reaction is, however, practiced in an aqueous alcohol solution, the solubilization can be prevented, and thus the production of dextrins with lower D.P.'s has become attainable.

More particularly, since with an addition of an organic solvent or organic solvents, such as methanol, ethanol, propanol and acetone, the reaction temperature can be elevated up to the temperature at which starch granules gelatinize, the reaction time can be shortened to a great extent.

In order to obtain dextrins with a D.P. around 28-29, if starch is reacted at 37° C. using 1 N hydrochloric acid or 1 N sulphuric acid the reaction requires 18 days, and if 1 N nitric acid is used a reaction preiod of 60 days is necessary. On the other hand, with the employment of a 1 N hydrochloric acid solution in 70% ethanol the elevation of the reaction temperature to over 65° C. and shortening of the reaction period to less than 12 hours is possible.

Furthermore the low molecular dextrins obtained in the invention are characterized in that they possess a large amount of linear chained components. Therefore the product possesses a higher limit of hydrolysis by beta-amylases than those of ordinary dextrins. The increase of the linear chained molecules caused by the easy debranching of the amylopectin present in the starch may be conceived as the attribute for the rise of the beta-amylolysis limit. Based on the utilization of the above findings the inventors invented a process applicable for the production of high maltose syrups using the dextrin product obtained according to the invention as starting material and then subjecting said product to the action of a beta-amylase.

The invention having been described in detail, the following examples are presented to show the specific embodiments thereof. It will be understood that the examples are presented for illustration purposes only and not by way of limitation. Unless otherwise specified, all percentages indicated are based on weight.

EXAMPLE 1

20 gm. of sweet potato starch (moisture content 18%) and 50 ml. of 65% aqueous ethanol solution were admixed, whereupon a sufficient amount of hydrochloric acid to prepare the total mixture to 1 N was added to mixture. After allowing the mixture to stand at 65° C. for 24 hours, the mixture was deacidified and washed with ethanol and thus granular dextrins were recovered in a yield of 70%. The mean D.P. of the product was 24.8. The product was further hydrolyzed, resulting in the finding that the limit of hydrolysis was 70.2% showing an extreme increase from the 58% obtained with starch used as starting material.

EXAMPLE 2

In this example 1 N sulphuric acid of a 75% aqueous ethanol solution was added to sweet potato starch. After reacting the mixture for 72 hours at 65° C., the resultant product was washed and deacidified with ethanol and dried. A product with a mean D.P. of 22.1 (D.P. 10–30) was obtained in a yield of 60%. The beta-amylolysis limit was 78.1% and the product was conceived to consist mainly of linear chained dextrins.

EXAMPLE 3

To 100 gm. of corn starch was added 300 ml. of 70% ethanol which was adjusted to 1 N with hydrochloric acid. Thereafter the mixture was kept in an Erlenmeyer flask equipped with a counter-current type cooler for 20 hours at 65° C. The reaction mixture was filtered, and the precipitate was immersed in 200 ml. of 80% methanol for two hours to remove the hydrochloric acid and then dried. A product with a mean D.P. of 25.5 was recovered in a yield of 67%. The hydrolysis of the product was 75.5% by beta-amylolysis at a concentration of 1%. The product was found warm water soluble.

EXAMPLE 4

A mixture which was prepared by admixing 100 gm. of waxy corn starch and 200 ml. of a 60% acetone solution and adjusted to 1 N with sulphuric acid was kept at 60° C. for 70 hours in an Erlenmeyer flask equipped with a counter-current type cooler. The starch granules were filtered, washed with 70% acetone to remove the acidity of the sulphuric acid and then dried. The yield was 72%, and mean D.P. was 25.5%.

EXAMPLE 5

Following the procedure described in Example 2 sweet potato starch was immersed in an ethanol solution adjusted to 1 N with sulphuric acid wherein the starch was treated at 65° C. for 72 hours. The starch, which was subsequently deacidified and washed, was prepared into an aqueous solution with a concentration of 25%, adjusted to pH 6.0, three units of beta-amylase extracted from wheat bran were added per gram starch and then the mixture was saccharified at 60° C. for 10 hours. The saccharified solution thus obtained was decolorized and purified with active carbon and ion exchangers. The colorless saccharified solution was then concentrated and thus a syrup was obtained. The product was a high maltose syrup with a maltose content of 75%, possessed a viscosity relatively lower than the ordinary maltose syrups and was characterized in possessing stable properties.

What we claim:

1. A process for the production of granular soluble starch or dextrins having a D.P. less than about 28 comprising acidifying an aqueous organic liquid suspension of starch granules, heating said suspension below but near the gelatinization temperature of the starch for a time sufficient to saccharify the starch granules to a D.P. less than about 28, and recovering the dextrin product, said organic liquid being present in a concentration to substantially prevent solubilization of said dextrins and wherein said organic liquid is a member selected from the group consisting of methanol, ethanol, n-propanol, isopropanol, a fatty acid and acetone.

2. A process according to claim 1 wherein the saccharification is conducted at a temperature of approximately 60–65° C.

References Cited

UNITED STATES PATENTS

| | | | |
|---|---|---|---|
| 2,374,676 | 5/1945 | Gardner | 127—38 |
| 3,607,395 | 9/1971 | Stephenson | 127—38 |
| 2,386,509 | 10/1945 | Schoch | 127—32 |

MORRIS O. WOLK, Primary Examiner

S. MARANTZ, Assistant Examiner

U.S. Cl. X.R.

127—33; 195—31 R